(No Model.)
S. F. WEAVER.
CULTIVATOR.
No. 315,865. Patented Apr. 14, 1885.
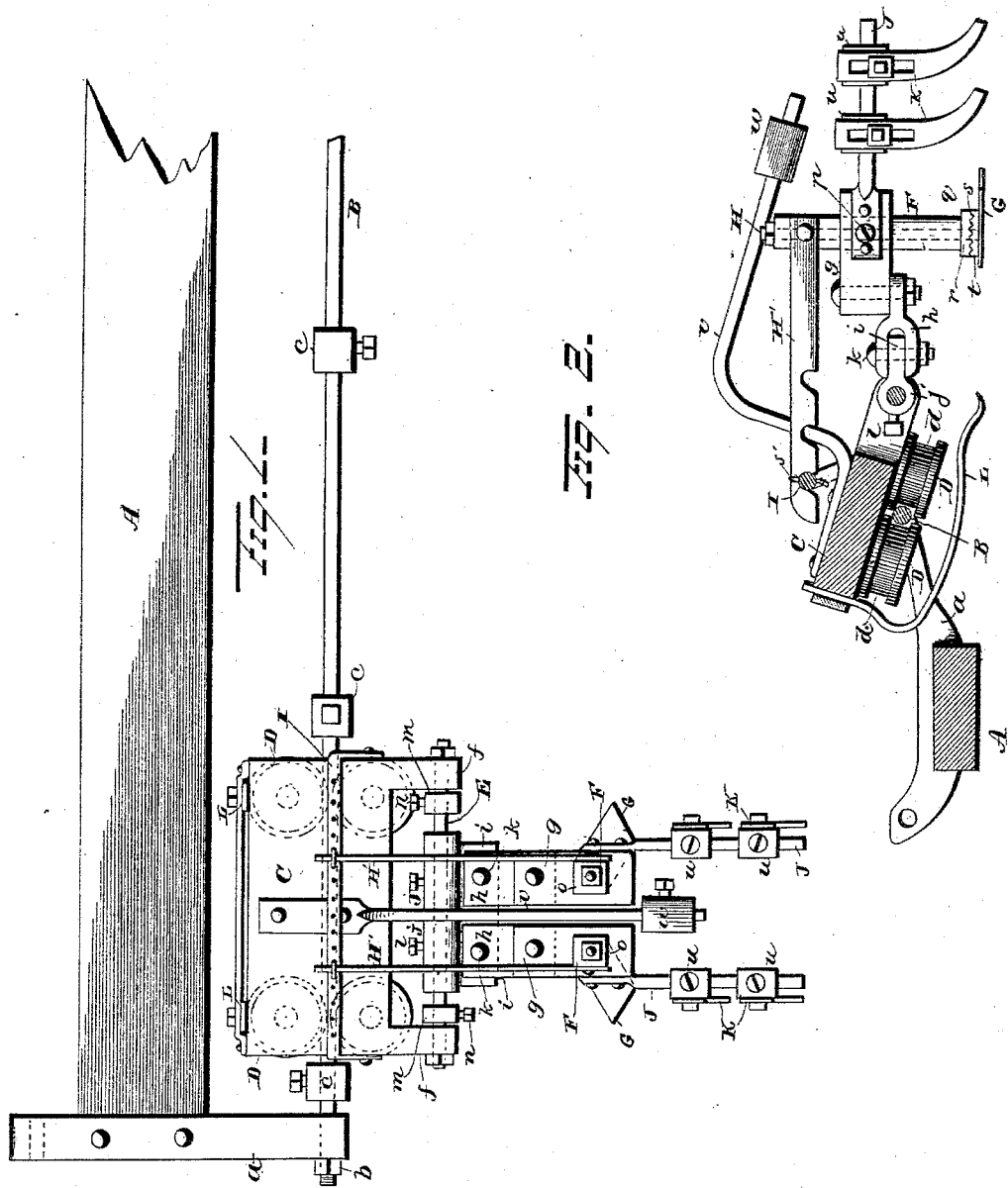
WITNESSES
G. F. Downing
Ken T. Gill
INVENTOR
Solomon F. Weaver.
By H. A. Symmon.
ATTORNEY

UNITED STATES PATENT OFFICE.

SOLOMON F. WEAVER, OF PORTIS, KANSAS.

CULTIVATOR.

SPECIFICATION forming part of Letters Patent No. 315,865, dated April 14, 1885.

Application filed September 24, 1884. (No model.)

*To all whom it may concern:*

Be it known that I, SOLOMON F. WEAVER, of Portis, in the county of Osborne and State of Kansas, have invented certain new and useful Improvements in Cultivators; and I do hereby declare the following to be a full, clear, and exact description of the invention, such as will enable others skilled in the art to which it appertains to make and use the same.

My invention relates to an improvement in cultivators especially designed for cultivating listed corn. When a lister is employed for the purpose of making a furrow, it throws the earth to either side of the furrow in sharp ridges, leaving a quantity of soil upon either side of the seed planted in the middle of the furrow and occupying a much higher position. As the lister passes through the earth a portion of the latter falls back into the furrow, coming from the outer edges of the ridges, leaving the outer edge very thin at those places. In a short time, from the effects of the hot sun, weeds spring up, and as they occupy ground higher than the corn, soon shade the latter and retard its growth.

The object of my invention is to provide a device which shall cut the weeds from the corn and gently cut and deposit the earth around the plants without injury thereto. A further object is to produce a cultivator designed for this purpose which shall be simple and economical in construction, and at the same time durable and efficient in use; and with these ends in view my invention consists in certain novel features of construction and combinations of parts as will be hereinafter described, and pointed out in the claims.

In the accompanying drawings, Figure 1 is a top plan view of my improvement. Fig. 2 is a vertical sectional view of the same.

A represents a beam, preferably constructed of wood, and of any desired dimensions, and which is adapted to operate as a leveler. To the ends of this leveler are secured the transverse beams or supports $a$, to the forward ends of which latter are secured whiffletrees, to which the draft is applied, and through the rear ends of which arms passes the metal rod B, provided on its end with a screw-thread adapted to receive the nuts $b$, which impinge against the said beams $a$ and keep the rod in proper position. To this rod are secured the frames C, preferably three in number, and separated by means of collars $c$, which are secured to the rod B, the collars being placed at such distances apart as to allow of a lateral movement of the frames C on the bar. To the under side of each of these frames are secured four pulleys, D, arranged as shown, each pulley being provided with a peripheral groove, $d$, in which fits the rod B, the edges of the wheels coming in such close proximity to each other as to obviate all danger of the frame C becoming detached from the rod.

To the rear projecting ends, $f$, of each of the frames C is secured the cross-beam E, to which are secured the rearwardly-extending beams $g$, the latter being provided on the front ends with the clamp-clevises $h$, which embrace lugs or projections $i$, formed on collars $j$, fitting on the rod E, bolts $k$ passing down through perforations in the lugs and clevices and holding them together. The collars $j$ are each provided with a set-screw, $l$, the ends of which may screw down against the cross-beam E, and its respective beam thereby held rigid with the frame. Between the beams $g$, and on either side of the collars $j$, are located the collars $m$, each provided with a set-screw, $n$, to hold it securely to the cross-beam E and limit the lateral movement of the beams $g$. Each of the beams $g$ is provided with a hole or perforation, $o$, through which extend the vertical plow-standards F, each adapted to be held in any vertical adjustment by means of the set-screw $p$, passing through the beam $g$ and impinging against the plow-beam, or, if desired, by means of wedges forced in between the sides of the perforation in the beam $g$ and the plow-standards. To the lower ends of these standards F are secured the metal plates $q$, centrally provided with a perforation, $r$, and with radial grooves $s$. To each of the knives or plows G, on their upper surfaces, is secured or formed integral therewith a raised disk, $t$, also provided with radial grooves $s$ and a central perforation. When the plows or knives G are placed in position, the disks $t$ fit against the plates $q$, and are held in their proper positions by means of rods or bolts H, passing up through the standards F, the lower end of each of said bolts being provided with a head countersunk in the heel of its plow, the upper end being provided with a nut fitting against the top of the plow-standard. By means of the connected plates $t$ and $q$ the knives may be turned around in any desired adjustment and held against displacement by the rod.

To the upper portion of each of the standards F is pivotally secured the notched bar H', extending over the frame C, in which notches is adapted to fit the arched bar I, the ends of which are rigidly secured to the sides of said frame. By raising the bar H' or bringing the same forward the knives or plows, together with the beams $g$, may be raised and held in any desired adjustment by means of the bars H' and I.

If desired, the arched rod may be provided with perforations adapted to receive split-key $s'$, for the purpose of preventing the bar or lever H' from moving laterally when in its required adjustment.

To the rear ends of the beams $g$ are adjustably secured the beams J, to which are secured the cultivators K, preferably by means of collars $u$, which allow said cultivators to be adjusted on the latter and the collars on the beams J, so that if desired the knives or cultivators may be made to travel at an angle with the line of draft, and at the same time adjusted to an inclined position, thereby cutting and overturning the earth on the side of the ridges formed by the lister.

To the forward ends of each of the frames C are adjustably secured spring-guides L, extending underneath of said frames and to some extent sustaining the weight thereof and that of the rear portion of the leveling-beam A. These springs are preferably made tapering and weakest at their rear ends, and are adjusted to diverge toward said latter ends, so that they will bear on the outer edges of the listed furrow, the elasticity of the springs being such that they will not fully vertically sustain the weight brought to bear in that direction, and their strength in a horizonal direction is such that they will guide and cause the frame to retain its proper position over the listed furrow. It will also be seen that these springs, traveling on the outer edge of the furrow on the earth which has been overturned by the lister, and which has been kept standing in a perpendicular position by the lister, cause the soil in some degree to be undermined, thereby causing small quantities of the earth to fall into the furrow, thus beginning the work of filling up the furrow in such a way that the corn is in no danger of being covered up or damaged.

For the purpose of keeping the frames down in position I have provided a bent rod, $v$, secured to the frames and provided with weights $w$, which may be moved back and forth on the rods over the frame, as desired. A seat may also be secured to the frame for the convenience of the operator.

When desired to use the machine, the forward ends of the spring-guides are vertically adjusted in accordance with the depth of the furrow, and in such proximity to each other that they will travel in the furrow, but not close enough to touch the corn growing in the center of the furrow, the rear ends being adjusted to travel on the outer edges of the furrow. The plow-beams are then laterally adjusted in the manner heretofore described, to permit the corn to pass between the heels of the plows without interference, the plows on the ends thereof being adjusted as desired. The plows are also lifted and the proper inclination imparted thereto by means of the notched bar, in order to cut into the soil as desired, by the operator, the bar being moved forward, causing the plow-standards to assume an inclined position, thereby enabling the plows or knives to cut deeper into the earth and moving it slightly back, and vice versa.

As shown by the drawings, the cultivator knives or harrows may be either rigid or flexible with relation to the frames, and are laterally adjusted to turn the soil that has been undermined and cut by the plows. If the corn is small, the colters or knives should be so adjusted, in the manner set forth, to throw little earth into the furrow.

In case it is desired to cut the weeds which have grown to considerable height and covering the ridge, the knives are adjusted horizontally in order to take a wider strip or swath than the plows will do; and, again, a portion of the cultivators or colters may be adjusted to run vertically and a portion horizontally. In case more than one knife is secured to a beam, the latter should be secured to the frame C at an angle, thus bringing the knives out of line with each other. Should any of the rows vary in width, the guides will cause the frame to follow the furrow made by the lister, the frame being allowed to move on the rod C, the friction of the frame moving thereon being greatly reduced by the pulleys or rollers thereon.

In transporting the machine the frame C is turned over on the rod B until it rests on the leveler A, which can then be drawn along without difficulty.

After the field has once been cultivated and it is desired to cultivate with the implement the second time, the spring-guides may be laterally adjusted to suit the width of the furrow, in the manner already described. The beams to which the colters are secured are also at this stage fastened to the inside of the beams, thus bringing the knives nearer the corn, the knives being so adjusted that a portion thereof will cultivate the soil near the corn and the remainder the soil cut and undermined by the plows.

I would have it understood that I do not limit myself to the exact construction of parts shown and described, but hold myself at liberty to make such changes and alterations as fairly fall within the spirit and scope of my invention.

Having fully described my invention, what I claim as new, and desire to secure by Letters Patent, is—

1. The combination, with a leveling-beam, of a frame or frames loosely attached thereto, plow-standards provided on their ends with plows, knives, or colters indirectly connected with the frame, and spring-guides secured to said frame, substantially as set forth.

2. The combination, with a leveling-beam having a parallel rod secured to arms fastened to the ends of the beam, of a frame or frames, each provided with grooved pulleys, between which fits said rod, plows, and colters indirectly connected to said frame, substantially as set forth.

3. The combination, with a leveling-beam having a parallel rod secured to arms fastened to the ends of said beam, of a frame or frames, each provided with pulleys between which fits said rod, beams loosely secured to the frame, plow-standards secured to said beams, plows secured to the plow-standards, and colters secured to beams indirectly connected to said frame, substantially as set forth.

4. The combination, with a leveling-beam, of a frame loosely attached thereto, laterally-adjustable beams secured to the frame and provided with holes or openings, vertically-adjustable plow-standards passing through said holes and provided on their lower ends with adjustable plows, and knives or colters adjustably secured to beams, secured to said laterally-adjustable beams, substantially as set forth.

5. The combination, with a leveling-beam, of a frame loosely attached thereto, plows and colters indirectly attached to said frame, and spring-guides, the forward curved ends of which are adjustably secured to the front of the frame and adapted to travel in the furrow, the rear ends adapted to travel outside of the furrow, substantially as set forth.

6. The combination, with a leveling-beam having a rod secured to cross-beams which are fastened on the ends of said beam, of a frame provided with grooved pulleys on its under side, between which fits said rod, spring-guides adjustably secured to the forward end of the frame and passing under said pulleys, and plows and colters indirectly secured to said frame, substantially as set forth.

7. The combination, with a leveling-beam, of a frame or frames loosely attached thereto, and laterally-adjustable beams secured to said frame or frames, vertically-adjustable plow-standards secured in openings in said beams, and provided on their lower ends with adjustable plows, knives or colters adjustably secured to said former beams, and serrated bars pivotally secured to the plow-beams, the serrations of which engage with an arched bar secured to the frame, substantially as set forth.

8. The combination, with a leveling-beam having a rod secured to cross-beam fastened to the ends thereof, of two or more frames provided with grooved pulleys, between which fit said rod, the travel of the frames on the rod being limited by collars secured to said rod, and adjustable plows and colters indirectly connected with said frames, substantially as set forth.

9. The combination, with a leveling-bar, of a frame or frames attached thereto, plow-beams adjustably secured thereto, plow-standards adjustably secured to the plow-beams, cultivator-beams secured to the plow-beams, a weight secured to and suspended over said frame, and spring-guides secured to the forward ends of and passing beneath said frame, substantially as set forth.

In testimony whereof I have signed this specification in the presence of two subscribing witnesses.

SOLOMON F. WEAVER.

Witnesses:
R. G. HAYS,
H. I. BRYANT.